United States Patent

Taub

[15] 3,706,190
[45] Dec. 19, 1972

[54] ROTARY POWER MOWER HAVING AN IMPROVED DEFLECTOR FOR THE DISCHARGE OUTLET

[72] Inventor: Jack D. Taub, New York, N.Y.
[73] Assignee: G. W. Davis Corporation, Richmond, Ind.
[22] Filed: Oct. 20, 1971
[21] Appl. No.: 190,727

[52] U.S. Cl. .....................56/13.4, 56/202, 56/320.2
[51] Int. Cl. ............................................A01d 35/26
[58] Field of Search.....56/320.2, 202, 13.4, DIG. 22, 56/255

[56] References Cited

UNITED STATES PATENTS

| | | | |
|---|---|---|---|
| 3,049,853 | 8/1962 | Horner | 56/13.4 |
| 3,077,065 | 2/1963 | Samways et al. | 56/15.8 |
| 3,192,692 | 7/1965 | Slemmons | 56/13.4 |
| 3,220,170 | 11/1965 | Smith et al. | 56/255 |
| 3,420,041 | 1/1969 | Irgens | 56/320.2 |
| 3,568,421 | 3/1971 | Smith et al. | 56/255 |

*Primary Examiner*—Russell R. Kinsey
*Attorney*—William R. Jacox et al.

[57] ABSTRACT

The deck member of a rotary power mower has a grass discharge outlet which is normally covered by a scoop-like deflector member for directing grass clippings, stones and other solid objects back onto the ground outboard of the wheels supporting the deck member. The upper portion of the deflector member is pivotally connected to the deck member adjacent the top of the discharge outlet, and the deflector member is movable from its lower operative position covering the outlet to an upper retracted or inoperative position against the bias of torsion coil springs to provide for attaching a grass catcher bag adapter directly to the deck member. The deflector member includes front and rear curved walls which are rigidly connected by an outer wall sloping downwardly and outwardly from the top of the discharge outlet, and the lower edges of the walls are substantially level with the lower edge of the deck member.

9 Claims, 6 Drawing Figures

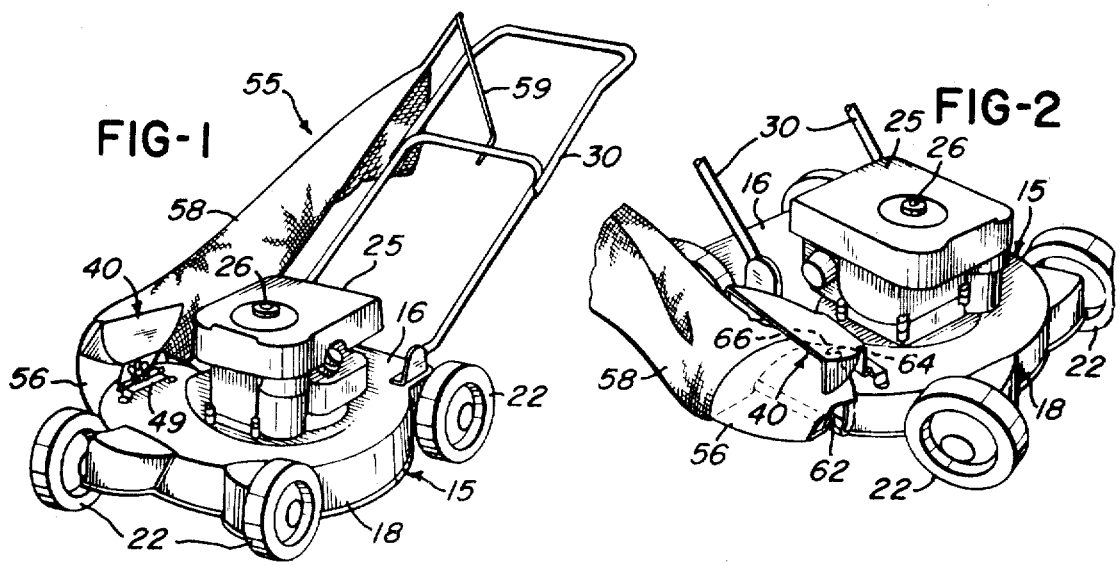
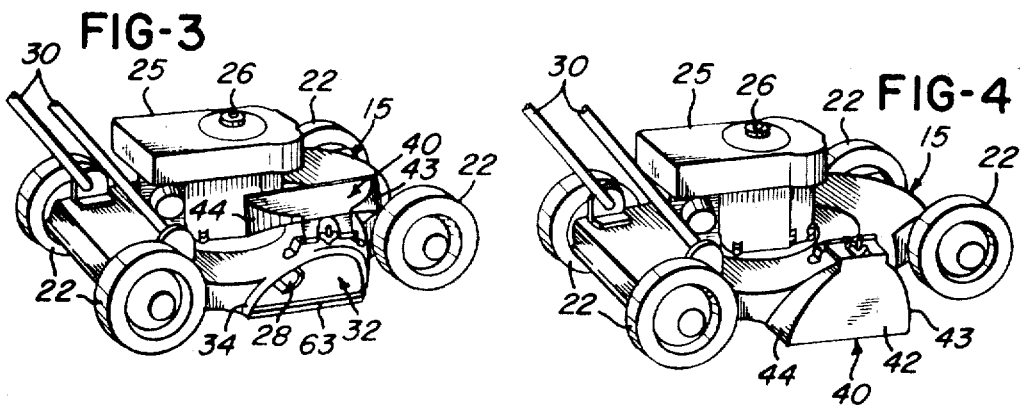
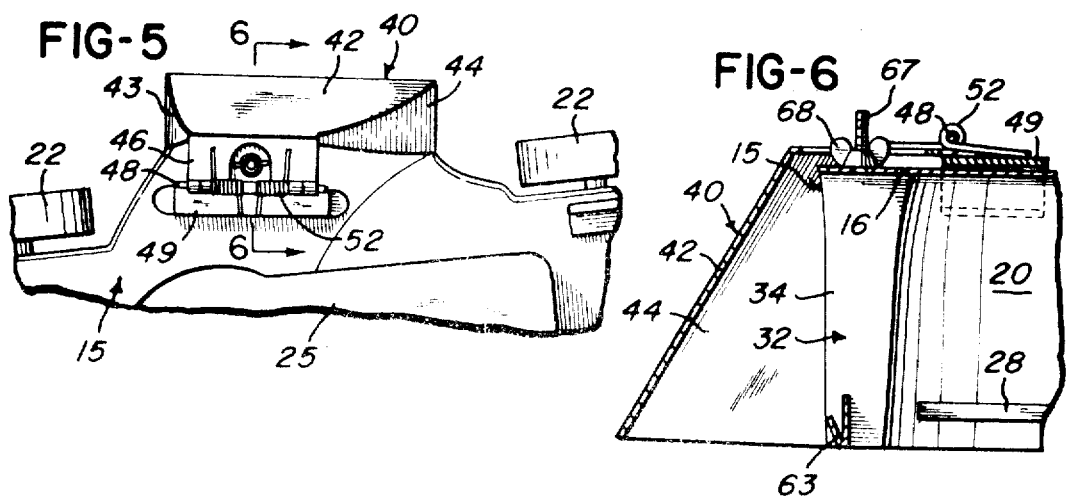

ROTARY POWER MOWER HAVING AN IMPROVED DEFLECTOR FOR THE DISCHARGE OUTLET

BACKGROUND OF THE INVENTION

In a rotary power mower of the walking type, a housing or deck member is usually fabricated from sheet steel or cast from aluminum and has a downwardly projecting skirt portion to define a downwardly facing cavity or chamber. The deck member is supported for ground traversing movement by a set of four wheels which are adjustable for changing the height of the deck member relative to the ground. A gasoline engine is commonly mounted on the deck member and includes a vertical shaft which projects downwardly through the deck member into the chamber and supports a grass cutting blade having sharpened outer edge portions.

Preferably, a discharge outlet is formed within one side of the deck member and provides for distributing grass clippings propelled by the cutting blade back onto the ground. A duct-like adaptor is sometimes attached to the deck member and forms an extension for the outlet for directing the grass clippings into a grass catcher bag which is attached to the adaptor.

It has been found desirable to provide some form of deflector for directing propelled grass clippings, stones, sticks and other such solid objects downwardly onto the ground when the power mower is being used without the grass catcher attachment. One form of deflector which has been used consists of a valve-like member which is rotatably supported within the adaptor duct used for attaching the grass catcher bag. The valve member is rotated to an open position when the catcher bag is attached and is movable to a downwardly sloping or partly open position when the catcher bag is not attached. The valve member is also movable to a closed position when it is desired to effect mulching of the grass clippings under the deck member.

This valve system is not only expensive in construction, but also tend to collect grass clippings within the adaptor and does not provide for completely covering the entire discharge outlet when the valve member is partly opened. Other types of rotary mowers have been constructed without any discharge outlet in the deck member. While such a construction forms an effective barrier to the projection of stones, sticks and the like, this construction does not provide for distributing grass clippings uniformly back onto the ground or for attaching a bag for catching or collecting the grass clippings.

SUMMARY OF THE INVENTION

The present invention is directed to a rotary power mower which incorporates an improved deflector member for normally covering the entire discharge outlet to provide for deflecting stones and other objects propelled by the cutting blade back onto the ground and also to provide for effectively distributing grass clippings outwardly onto the ground. The deflector member of the invention further provides for conveniently attaching a grass catcher bag attachment directly to the deck member and assures that the discharge outlet is covered and protected when the grass catcher attachment is temporarily removed from the deck member to be emptied. The deflector member of the invention is also simple and economic in construction and is adapted to be quickly assembled to the mower.

In accordance with one embodiment of the invention, the deflector member has a scoop-like configuration and is pivotally connected by a hinge to the deck member adjacent the top of the discharge outlet. The deflector member is movable between a lower position completely covering the outlet and an upper position projecting above the deck member. The deflector member is biased towards its lower position by a set of torsion coil springs, and in its lower position, the deflector member is orientated and positioned so that any stone or solid object propelled by the mower blade is diverted downwardly against the ground.

The lower edge of the deflector member is substantially level with the lower skirt edge of the deck member, and the deflecting member is so positioned that the downwardly deflected grass clippings are carried by an air flow to be spread uniformly outwardly onto the ground. When the deflector member is moved to its upper position, the grass catcher bag adaptor may be conveniently and quickly attached to the deck member so that the adaptor covers the entire discharge outlet.

Other features and advantages of the invention will be apparent from the following description, the accompanying drawing and the appended claims.

FIG. 1 is a perspective view of a rotary power mower incorporating an improved deflector member constructed in accordance with the invention and showing the deflector member in its inoperative position when a grass catcher unit is attached to the mower;

FIG. 2 is a fragmentary perspective view of the power mower shown in FIG. 1 and taken from a different position;

FIG. 3 is a fragmentary perspective view illustrating the deflector member in its upper retracted position, but with the grass catcher attachment removed from the discharge outlet;

FIG. 4 is a perspective view similar to FIG. 3 and showing the deflector member in its normal lower operative position covering the discharge outlet;

FIG. 5 is a fragmentary top view of the power mower and deflector member as shown in FIG. 4; and FIG. 6 is a fragmentary section taken generally on the line 6—6 of FIG. 5.

DESCRIPTION OF THE PREFERRED EMBODIMENT

The walking type rotary power mower shown in FIG. 1 generally includes a housing or deck member 15 preferably formed of sheet steel and including an upper wall portion 16 from which a skirt portion 18 depends downwardly to define a downwardly facing generally circular cavity or chamber 20. The deck member 15 is supported by a set of four wheels 22 which are vertically adjustable relative to the deck member 15 by corresponding pivotable levers to adjust the level of the deck member from the ground according to the height at which the grass is to be cut.

A gasoline engine 25 is mounted on the deck member 15 and has a vertical shaft 26 which extends downwardly through the deck member 15 and into the chamber 20 to support a cutting blade 28 having sharpened outer end or tip portions. A handle member 30 slopes upwardly from the deck member 15 and provides for pushing, pulling and guiding the mower along a desired path.

As shown in FIG. 3, the chamber 20 has a generally tangential discharge outlet 32 which is defined by a discharge chute portion 34 of the deck member 15 located between one set of side wheels 22. The outlet 32 has generally an airfoil shaped configuration, but may be generally rectangular, oval or some other configuration, if desired.

In accordance with the present invention, a deflector member 40 (FIG. 4) is positioned adjacent the discharge chute portion 34 of the deck member 15 and includes a generally flat outer wall 42 which rigidly connects a curved front wall 43 and a curved rear wall 44 to define a downwardly facing scoop-like configuration. A pair of spaced ears or flanges 46 project inwardly from the upper portion of the deflector member 40 and are pivotally supported by a hinge pin 48 having outer end portions supported by an inverted generally U-shaped bracket 49 secured to the discharge chute portion 34. The hinge pin 48 provides for moving or pivoting the deflector member 40 between an operative lower position (FIGS. 4 and 5) and a retracted or inoperative upper position (FIGS. 1, 2 and 3).

A pair of torsion coil springs 52 are mounted on the hinge pin 48, and each spring 52 has one end portion which engages a flange 46 and an opposite end portion which engages the bracket 49 so that the springs are effective to urge or bias the deflector member 40 normally to its lower position covering the discharge outlet 32. As illustrated in FIG. 6, when the deflector member is in its lower position, the lower edges of the walls 42-44 are substantially coplanar or level with the lower edge of the skirt portion 18 of the deck member 15.

The deflector member 40 provides for attaching a grass catcher assembly 55 directly to the deck member 15. The grass catcher assembly 55 includes a tubular duct-like adapter 56 which has a slightly curved configuration. A fabric grass catching bag 58 is secured by a cord to one end portion of the adapter 56, and the opposite end of the bag is normally supported by a rod 59 attached to the handle member 30. The opposite end portion of the adapter 56 conforms to the airfoil configuration of the discharge chute portion 34 of the deck member 15 and has a downwardly projecting flange 62 which is received within a V-shaped rail 63 extending across the bottom of the outlet 32.

A slot 64 is formed within an inwardly projecting upper ear portion 66 of the adapter 56 and is adapted to receive a threaded stud 67 which projects upwardly from the top of the discharge chute portion 34. After the lower flange 62 is inserted into the rail 63, and the slot 64 receives the stud 67, a wing nut 68 is tightened on the stud 66 to clamp the top of the adapter 56 to the top of the discharge chute portion 34 of the deck member 15. During attachment of the adapter 56 to the deck member 15, the deflector member 40 is lifted to its elevated or upper position as illustrated in FIG. 3. After the adapter 56 is attached, the deflector member 40 is released so that it will rest against the top of the adapter 56 under the influence of the coil springs 52 as illustrated in FIGS. 1 and 2.

When the bag 58 is filled with grass clippings and is ready to be emptied, the bag 58 and adapter 56 are removed as a unit from the deck member 15 simply by loosening the wing nut 68 and lifting the adapter 56 from the retaining rail 63. When the adapter 56 is removed from the chute portion 34 of the deck member 15, the deflector member 40 quickly returns to its normal lower position covering the outlet 32. To reattach the grass catcher assembly 55, the deflector member 40 is pivoted to its upper position, and adapter 56 is recoupled to the chute portion 34 of the deck member 15.

From the drawing and the above description, it is apparent that a rotary power mower incorporating a deflector member constructed in accordance with the invention, provides desirable features and advantages. For example, the deflector member 40 provides an important safety feature in its lower position in that it effectively deflects any stone, stick or other solid object which is propelled through the discharge outlet 32 back onto the ground. The deflector member 40 is also effective to distribute or spread the grass clippings uniformly over the ground as a result of the high velocity air flow which is directed outwardly and under the outer wall 42 of the deflector member 40. The torsion coil springs 52 assure that the deflector member 40 normally remains in its lower position except when the deflector member is momentarily pivoted to its upper position for attaching the adapter 56 of the grass catcher assembly 55.

In addition, the deflector provides for attaching the adapter 56 directly to the discharge chute portion 34 of the deck member 15. Thus the deflector member 40 does not interfere with the smooth flow of grass clippings through the outlet 32 and adapter 56 and into the bag 58. As soon as the grass catcher assembly 55 is removed for emptying in the bag 58, the deflector member 40 immediately returns to its lower position covering the outlet 32 under the torsional force exerted by coil springs 52. Thus if any stone or other object was propelled by the cutting blade 28 while the grass catcher assembly 55 was temporarily removed, the stone or object would be deflected back towards the ground.

While the form of power mower and deflector member herein described constitutes a preferred embodiment of the invention, it is to be understood that the invention is not limited to this precise form of apparatus, and that changes may be made therein without departing from the scope and spirit of the invention.

The invention having thus been described, the following is claimed:

1. In a rotary power mower including a deck member defining a downwardly facing chamber having a discharge outlet, a vertical rotary shaft projecting through said deck member, a cutting blade disposed within said chamber and mounted on the lower end portion of said shaft, power operated means for driving said shaft, and wheel means supporting said deck member for movement across the ground, the improvement comprising a deflector member, means mounted on said deck member and supporting said deflector member for pivotal movement between an inoperative position projecting outwardly from said outlet and an operative position covering said outlet, means for urging said deflector member toward said operative position, and said deflector member includes an outer wall sloping downwardly and outwardly from said deck member and over said outlet when said deflector member is in said operative position to deflect propelled grass clippings and foreign objects downwardly onto the ground.

2. A power mower as defined in claim 1 wherein said means for urging said deflector member include at least one spring connecting said deflector member to said deck member.

3. A power mower as defined in claim 2 wherein said spring member comprises a torsion coil spring surrounding the pivot axis of said deflector member.

4. A power mower as defined in claim 1 wherein said outer wall of said deflector member also extends transversely relative to the normal forward direction of movement of said mower as defined by said wheel means.

5. A power mower as defined in claim 1 wherein said outer wall of said deflector member has a lower edge disposed substantially level with the lower edge of said deck member.

6. A power mower as defined in claim 1 including an adapter for coupling a grass catcher bag to said outlet, means for mounting said adapter directly on said deck member adjacent said outlet, and said deflector member being movable to said inoperative position before said adapter is mounted on said deck member.

7. A power mower as defined in claim 6 wherein said mounting means include a fastener projecting upwardly from said deck member adjacent said outlet, means on said adapter for receiving said fastener, and said deflector member is positioned to provide access to said fastener when said deflector member is in either of said positions.

8. A power mower as defined in claim 1 wherein said deflector member includes a front wall and a rear wall rigidly connected by said outer wall, and each of said front and rear walls has a curved configuration.

9. In a rotary power mower including a deck member defining a downwardly facing chamber having a discharge outlet, a vertical rotary shaft projecting through said deck member, a cutting blade disposed within said chamber and mounted on the lower end portion of said shaft, power operated means for driving said shaft, and wheel means supporting said deck member for movement across the ground, the improvement comprising a deflector member having a scoop-like configuration, means mounted on the top portion of said deck member adjacent said outlet and supporting said deflector member for pivotal movement between an upper inoperative position projecting above said outlet and a lower operative position covering said outlet, spring means for urging said deflector member toward said lower operative position, said deflector member having a wall sloping downwardly and outwardly from said deck member and over said outlet when said deflector member is in said lower operative position to deflect propelled grass clippings and foreign objects downwardly onto the ground, and said wall has a lower edge disposed substantially level with the lower edge of said deck member.

* * * * *